United States Patent [19]

Masters

[11] Patent Number: 4,999,556

[45] Date of Patent: Mar. 12, 1991

[54] PULSE WIDTH MODULATOR MOTOR CONTROL

[75] Inventor: Stephen C. Masters, Alamogordo, N. Mex.

[73] Assignee: Scott Motors, Inc., Alamogordo, N. Mex.

[21] Appl. No.: 485,940

[22] Filed: Feb. 27, 1990

Related U.S. Application Data

[63] Continuation of Ser. No. 175,774, Mar. 31, 1988, Pat. No. 4,910,447.

[51] Int. Cl.$^5$ .............................................. H02P 5/00
[52] U.S. Cl. .................................. 318/599; 318/139; 388/928.1; 388/812; 388/823
[58] Field of Search .............................. 318/280–294, 318/560–640, 430–434, 139; 363/37, 41, 98, 96, 132, 138; 388/800–823; 323/282, 289

[56] References Cited

U.S. PATENT DOCUMENTS

| | | |
|---|---|---|
| 3,213,343 | 10/1965 | Sheehen . |
| 3,716,767 | 2/1973 | Kuriyama et al. . |
| 4,032,825 | 6/1977 | Klimo . |
| 4,150,324 | 4/1979 | Naito . |
| 4,420,700 | 12/1983 | Fay et al. .......................... 323/282 |
| 4,635,927 | 1/1987 | Shu . |
| 4,636,711 | 1/1987 | Freymuth .......................... 323/282 |
| 4,644,255 | 2/1987 | Freymuth .......................... 323/282 |
| 4,658,203 | 4/1987 | Freymuth .......................... 323/282 |
| 4,673,851 | 6/1987 | Disser . |
| 4,705,997 | 11/1987 | Juzswik . |
| 4,819,597 | 4/1989 | Gale et al. ...................... 318/599 X |
| 4,823,056 | 4/1989 | Watanabe et al. ............... 318/599 X |
| 4,873,453 | 10/1989 | Schmerda et al. ............... 318/599 X |
| 4,893,067 | 1/1990 | Bhagwat et al. .................... 388/817 |
| 4,906,906 | 3/1990 | Lautzenhiser et al. ......... 318/599 X |

*Primary Examiner*—Paul Ip
*Attorney, Agent, or Firm*—Foley & Lardner

[57] ABSTRACT

A pulse width modulation control circuit includes a pulse width modulator which supplies a signal to a power switch tying together a DC signal generator and a motor and various sensing circuit including a control voltage disabler circuit. All of the sensing circuits are appropriately designed to ensure that the various components of the circuit are not damaged under abnormal conditions whether due to motor loads heavier than rated or undesired changes in AC current input or control voltages.

17 Claims, 7 Drawing Sheets

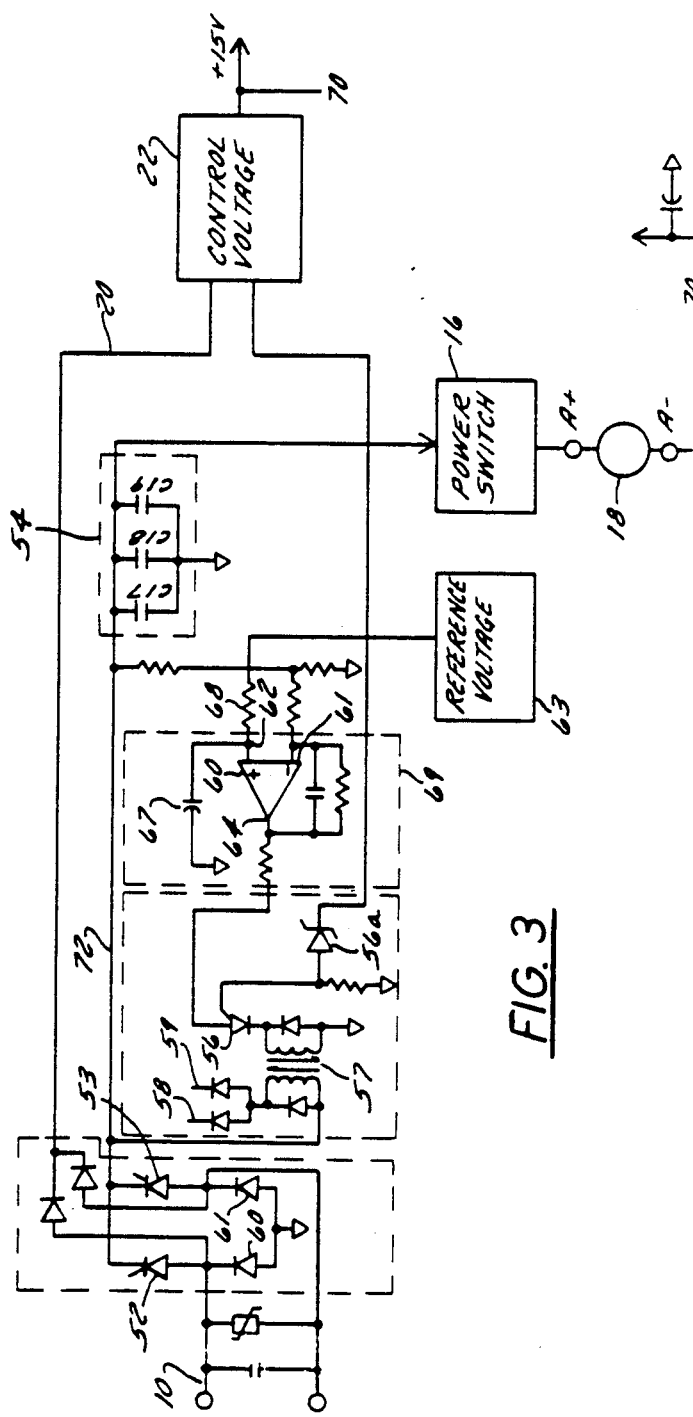
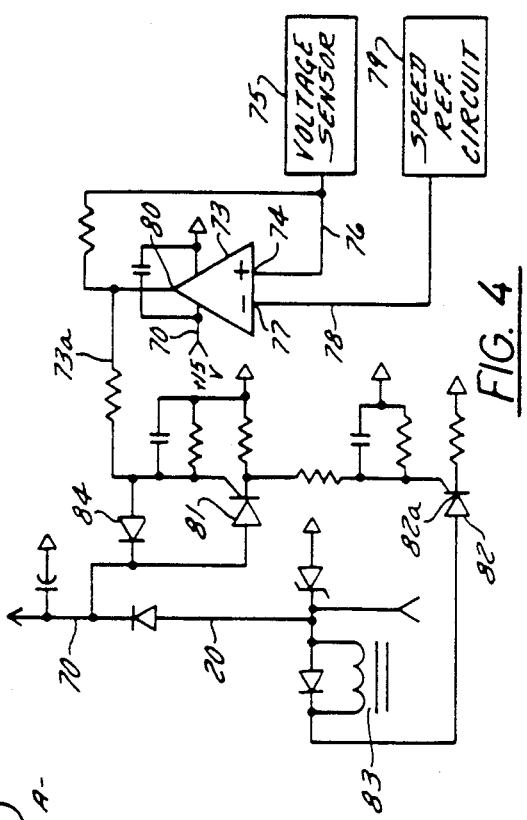
FIG. 3
FIG. 4

4,999,556

1

PULSE WIDTH MODULATOR MOTOR CONTROL

BACKGROUND OF THE INVENTION

This invention relates to pulse width modulated control system for a d.c. motor.

Control of motors by pulse width modulated signals is well known as described, for example, in U.S. Pat. No. 3,213,343 issued to Sheheen on Oct. 19, 1965. Such controls provide a superior way to smoothly accelerate and decelerate a d.c. motor under various circumstances. This is particularly advantageous when the motor is applied to a device such as an exercise treadmill or bed. It is particularly desirable to ensure operator comfort under a variety of possible circumstances such as fluctuating in the a.c. current input or failed components. Additionally, it is desirable to protect the other components in the circuit from surges in current or voltage experienced under abnormal operating conditions of the product being operated by the motor.

Another important consideration in the operation of any pulse width modulation control system is the ability to transfer maximum power to the load through a power switch. Four factors that contribute to system losses are:

(1) input or driving power losses;
(2) saturation or static losses when the system is on;
(3) switching or dynamic losses that result from the transition times when the device is turned on and off; and
(4) off losses due to the product of leakage current and power supply voltage.

Since input power losses can be substantial for various semiconductors, the metal oxide-silicon field effect transistor or MOSFET has found increasing acceptance as a power switch device since it has an extremely high static input impedance which allows it to turn on with significantly less input power.

Still another desirable feature in any control system is to ensure that the bridge rectification components such as silicon controlled rectifiers are triggered accurately with appropriate sensitivity. It is important that the stability of the triggering device such as a programmable unijunction transistor be observed carefully. The above and other features are addressed by the circuit described below.

SUMMARY OF THE INVENTION

In accordance with a preferred embodiment of the present invention, a pulse width modulation control circuit comprises a pulse width modulator which supplies a signal to a power switch tying together a d.c. signal generator and a motor and various sensing circuits including a control voltage disabler circuit, a motor voltage and current feedback circuit, and a low control voltage disabler circuit. All of the sensing circuits are appropriately designed to ensure that the various components of the circuit are not damaged under abnormal conditions whether due to motor loads heavier than rated or undesired changes in a.c. current input or control voltages.

The d.c. signal generator incorporates components sensitive to fluctuations in the a.c. input and which provide consistent rectification and minimal d.c. current ripple. To this extent, use of silicon controlled rectifiers triggered by programmable unijunction transistors coupled with zener diodes have proven particularly effective.

The control voltage supplied to various components of the circuit can be disabled under various abnormal circumstances by the control voltage disabler circuit in accordance with the present invention. Such circumstances are the failure of the power switch, a surge of the control voltage above a predetermined level, a failure of the rectification components in the d.c. signal generator, or excess speed in the motor.

The simple but effective feedback circuits sense changes in motor voltage and current and the pulse width modulator in response to the signals generated by the circuits will increase or decrease the motor speed accordingly.

Finally, the low control voltage disabler circuit senses the control voltage below a predetermined minimum and generates a signal in response thereto. The pulse width modulator responds to the presence of such signal and shuts off the power switch until the control voltage returns to a normal level.

BRIEF DESCRIPTION OF THE DRAWINGS

A preferred exemplary embodiment of the present invention will hereinafter be described wherein like numerals denote like elements and:

FIG. 3 is a schematic relating to the part of the circuit of FIG. 1 pertaining to the high voltage regulator and the motor voltage.

FIG. 4 is a schematic relating to part of circuit of FIG. 1 pertaining to control voltage generator and control voltage disabler.

DETAILED DESCRIPTION OF THE PREFERRED EMBODIMENT

Figure 1:
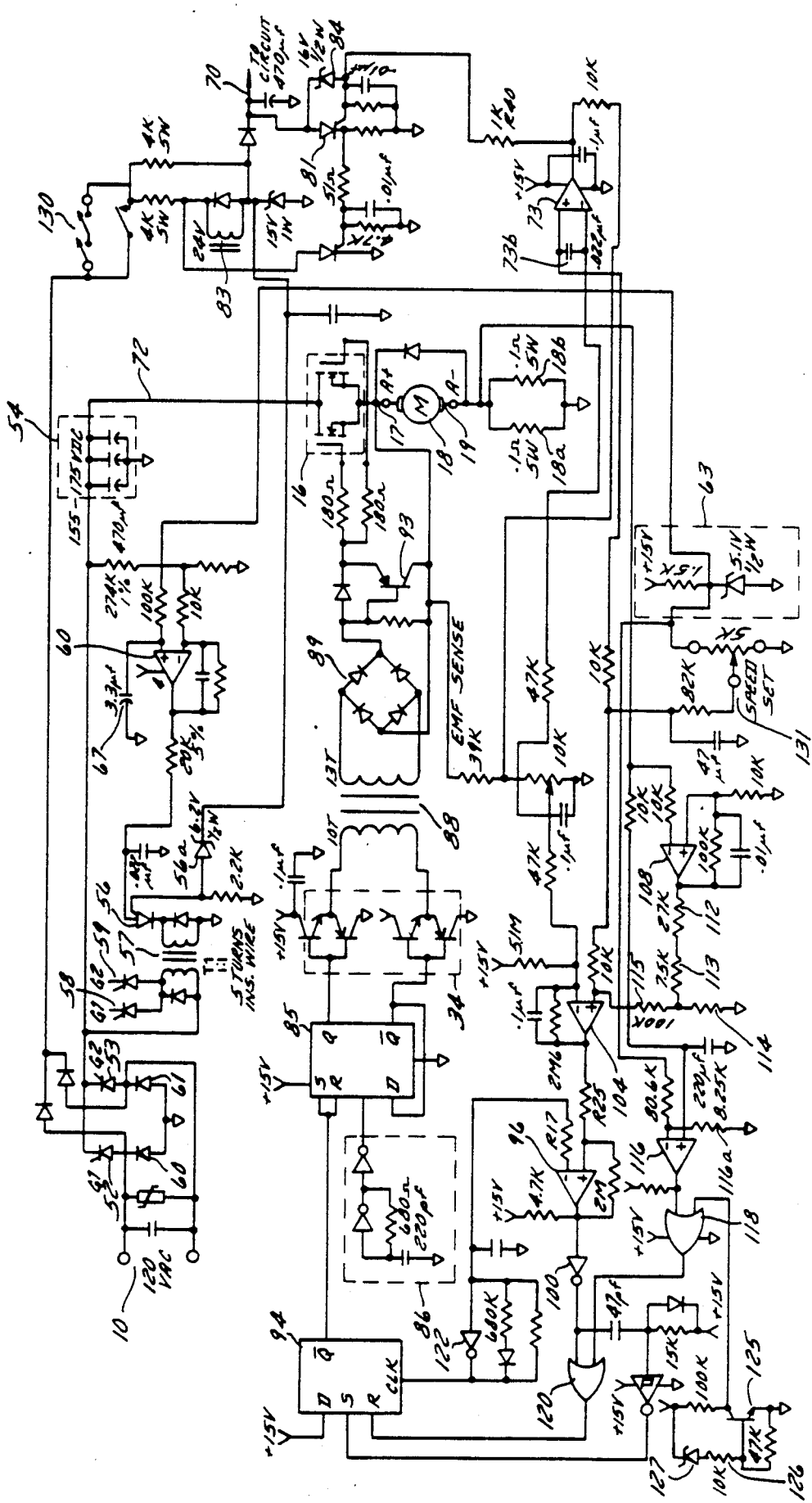
FIG. 1 is a schematic of a pulse width modulation circuit in accordance with a preferred embodiment of the present invention.

A detailed schematic of the circuit employed in accordance with the present invention is shown in FIG. 1. In order to clearly show the functional aspects of the circuit, reference is initially made to FIG. 2 which portrays in block diagram functional aspects of certain portions of the FIG. 1 circuit. It should be understood, however, the actual control device, in accordance with the present invention, when in operation, has many components and circuits which act in concert or serve multiple roles in providing the various functions portrayed in FIG. 2. Thus, when discussing the FIG. 2 block diagram, focus is made on functional aspects as opposed to actual circuits of the present invention.

A control circuit in accordance with the present invention suitably includes d.c. voltage output circuitry 12, receptive of the a.c. input signal and generating a d.c. output 14; a power switch 16, suitably a MOSFET transistor power switch; a motor 18 for powering a remote device (not shown); a high voltage regulator circuit 20; control voltage generation circuitry 22; control voltage disabler circuitry 24; a pulse width modulation generator 28; and a feedback sensor 42.

Initially the a.c. input 10 is supplied to motor voltage output 12 circuitry where, under normal conditions, the a.c. signal is rectified and then filtered and supplied as a d.c. signal 14 to power switch 16. Unless power switch 16 is closed, the d.c. signal is not applied to motor 18.

Voltage regulator 20 performs several important functions: provides an a.c. line disconnect; controls the voltage of respective capacitors used to assist in providing the d.c. signal output 14; and provides a soft start to such capacitors and limits the surge on the a.c. input line.

Control voltage generation circuitry 22 and control voltage disabler 24 cooperate to prevent motor 18 from being driven at excess speeds, and concomitant operation-forced overspeed of the remote equipment operated by motor 18. Control voltage generation circuitry 22 provides a control voltage, which may have a value of about 15 volts d.c., to various components of the total circuit which, if shut off, would cause various functions within the circuit to cease. Control voltage disabler circuit 24 utilizes this particular feature in the event of any of several situations. If certain components of power switch 16 should fail, d.c. current may pass unimpededly through line 17 to motor 18 possibly causing damage to motor 18 and the machinery it operates. Voltage disabler circuit 24 disables the control voltage circuitry 22 in the event that such components of power switch 16 fail. Circuit 24 also disables generation of control voltage circuitry 22 should the control voltage itself rise above 16 volts d.c., in the event that motor 18 overspeeds, or in the event any of the rectification components of motor voltage output 12 should fail.

To ensure that motor 18 operates between a predetermined maximum and minimum levels, power switch 16 must be controlled. To accomplish this, pulse width modulation generator (PWM generator) as 28, provides a series of pulses to the power switch 16 which is in a conductive state during a pulse and a non-conductive state when a pulse is absent. PWM generator 28 suitably comprises three functional blocks: a digital pulse generator 30, square wave generator 34, and a d.c. pulse generator 38. From digital pulse generator 30 is provided a square wave generator 34, which provides a series of square waves 36 to d.c. pulse generator 38. Pulse generator 38 rectifies the square wave into a pulse width modulated d.c. signal 40 for application to power switch 16. As stated before, power switch 16, in response to the presence or absence of signal 38, opens or closes the conductive path of signal 14 through power switch 16 to selectively provide d.c. drive signal 17 to motor 18. Generally, the longer power switch 16 is closed, the faster motor 18 operates.

Digital pulse generator 30 suitably also includes a low voltage disabler circuit. The primary function of the low voltage disabler circuit is to ensure that the control supply voltage is high enough to actuate power switch 16, i.e., provide switch 16 with a minimum required gate voltage. When the control voltage goes below a minimum predetermined level, low voltage disabler circuit inhibits power switch 16.

Error sensor 42 provides for maintaining constant motor speed with changes in motor load. Error sensor 42 detects changes in an armature voltage feed back signal 44 and armature current feed back signal 46 from a respective reference and provides an error signal 43 to digital pulse generator 30, which in response thereto, provides a digital signal containing information with respect to the error to square wave generator 34. In response thereto, square wave generator 34 provides square wave 36 with information concerning the error to d.c. pulse generator 38. Depending upon the information in signal 36, d.c. pulse generator provides a d.c. signal of varying pulse widths to power switch 16.

Figure 2:
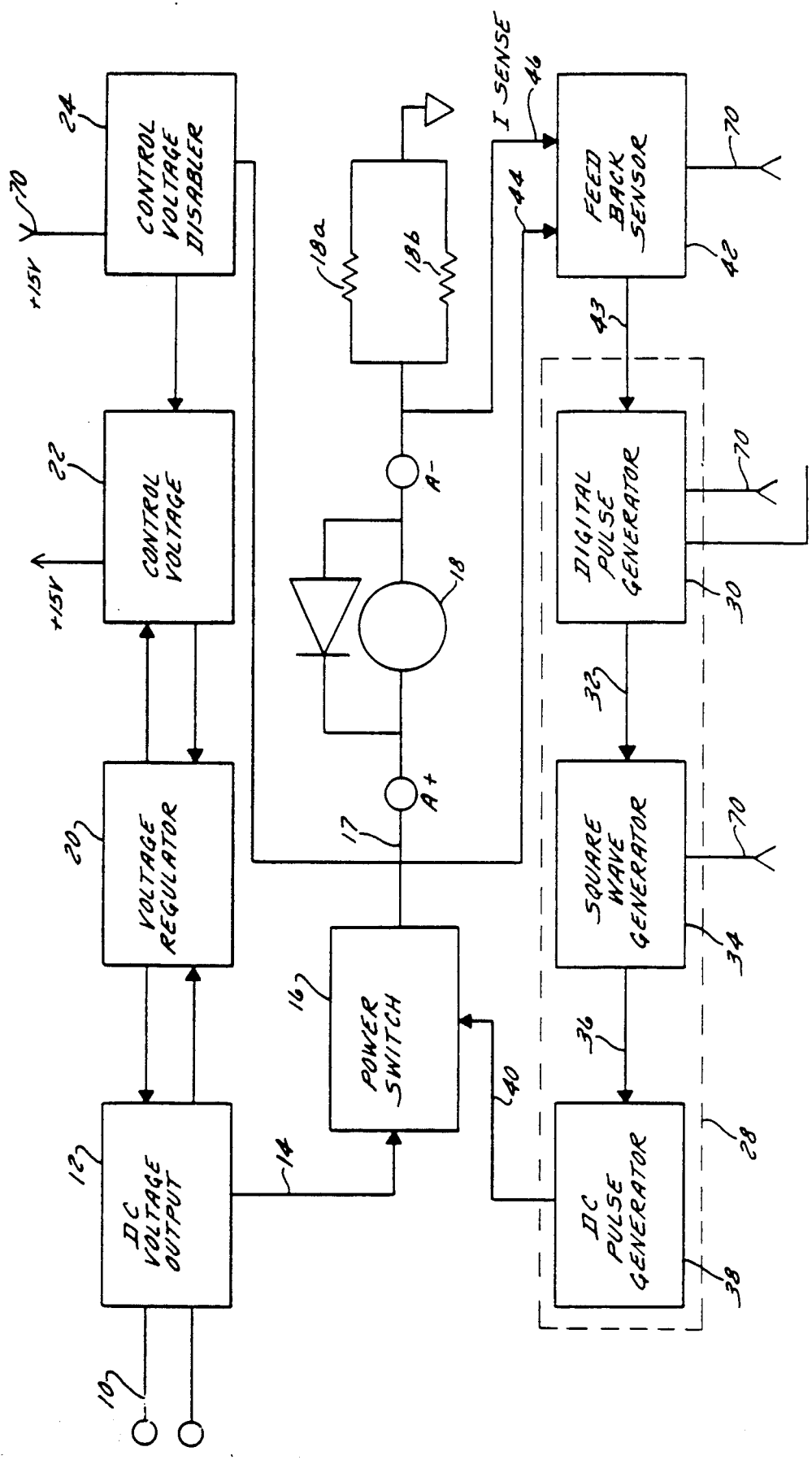
FIG. 2 is a block diagram of certain advantageous functional aspects of various circuit components of the FIG. 1 schematic.

D.C. voltage output circuitry 12 and voltage regulator 20 of FIG. 2 will be more fully described. For ease of explanation, the components of FIG. 1 corresponding to circuits 12 and 20, are separately shown in FIG. 3. As illustrated, 120 volt a.c. input 10 feeds the line voltage to a pair of SCRs 52 and 53 which, along with associated diodes 60 and 61, comprise a hybrid rectifying bridge. The cathodes of SCR's 52, 53 are both connected across a capacitor bank 54, comprised of 3 capacitors C17, C18 and C19, which in turn is coupled to power switch 16. The gates of SCRs 52 and 53 are connected to respective forward biased diodes 58 and 59, connected to the secondary coil of a transformer 57. A programmable unijunction transistor (PUT) 56 is connected to the primary coil of transformer 57. PUT 56 is driven by a circuit 69, including an operational amplifier 60. The negative (inverse) input of operational amplifier 60 (pin 61) is connected to capacitor bank 54, to provide a feed back voltage. The positive input (pin 62) of amplifier 60 is connected to a reference voltage source 63. The output (pin 64) of amplifier 60 is tied to unijunction transistor 56. Operational amplifier 60 is powered by a control voltage input 70 supplied by control voltage circuit 22 (connection not shown). The output of amplifier 60 (pin 64) drives transistor 56, to, in turn, provide a pulse to the primary of transformer 57. The concomitant trigger pulse at the secondary is fed via diodes 58, 59 to SCR 52 and SCR 53. When SCR 52 and 53 are forward biased by the a.c. line input, they are turned on by the trigger pulse.

There are numerous devices which may be employed to trigger silicon controlled rectifiers. Among the more common triggers are the unijunction transistor, programmable unijunction transistors (PUT), silicon bilateral switches, diacs, sidacs and silicon unilateral switches. The use of PUT in lieu of a unijunction transistor eliminates the need for certain resistors in triggering circuits. The trigger initiated by PUT 56 provides sensitive and unilateral triggering to SCRs 52 and 53. Referring again to FIG. 3, it should be noted that a zener diode 56a has been tied to the gate of PUT 56, the impedance of which significantly increases the stability of PUT 56.

D.C. output circuitry 12 and regulator circuit 20 additionally provide for the rectification and filtering of the a.c. signal and corrections for a.c. line input variations which, if not corrected, may cause transistor voltage ratings being exceeded or undesired motor speed variations. The voltage on capacitor bank 54 is maintained within a predetermined range. This is accomplished by applying a signal representing the voltage on capacitor bank 54 to the negative input (pin 61) of operational amplifier 60. The voltage output at pin 64 of amplifier 60 is, thus, inversely proportional to the voltage on capacitor bank 54. Decreases in the voltage output delays the firing of transistor 56, causing the output of SCR 52, 53 to be lower and, consequently, the lowering of the voltage on capacitor bank 54.

In the event the line voltage drops to a predetermined minimum level, for example a value of 108 volts a.c., SCRs 51 and 52 are fired early in the a.c. cycle, e.g. about 2 milliseconds after the zero crossing of the a.c. line voltage due to the increased output from amplifier 60. On the other hand, an increase in line voltage to a predetermined maximum level, e.g. 130 volts a.c., decreases the output at pin 64, delaying the pulse from transistor 56.

To provide a controlled start up when power is applied, the peak current through SCR 52 and SCR 53 and associated diodes 60 and 61 is limited. The positive input (pin 62) of amplifier 60 is connected across a capacitor 67, with reference voltage source 63, connected to input 62 through a resistor 68. Thus, the reference voltage is ramped on capacitor 67 through resistor 68, to provide a soft start. The respective valves of capacitor 67 and resistor 68 are suitably chosen such that capacitor 67 charges in less than one-half second, using the first 5 to 20 cycles of the a.c. line. The ramp function limits the peak current and protects the hybrid bridge circuit and capacitor bank 54 from high initial current surges.

In order to maximize operator safety, it is desirable that the entire circuit be shut down when certain events occur. For example, control voltage circuit 22 and control voltage disabler 24 provide advantageously for the disablement of control voltage circuit 22 when (1) the MOSFET transistor power switch 16 fails to the extent a short circuit therein results; (2) when control voltage 70 rises above predetermined maximum which may be, for example, 16 volts d.c.; (3) when motor 18 overspeeds; or (4) when the bridge circuit fails or the d.c. current is excessively rippled. The components of the circuit of FIG. 1 corresponding to functional blocks 12 and 24 of FIG. 2 are shown generally in FIG. 4, some of the components already having been described with reference to the control circuit 22. The major components of this circuit are a voltage comparator 73, a voltage sensor 75, a speed reference circuit 79, respective SCRs 81 and 82, and a relay 83. The positive input (pin 74) of comparator 73 receives an input signal 76 from voltage sensor 75 indicative of the voltage on the positive lead of the motor. The negative (inverse) input (pin 77) of comparator 73 receives a speed reference input signal 78 from speed reference circuit 79. The output of voltage comparator 73 (pin 80) is applied to the gate of SCR 81 the cathode of which, in turn, is tied to the gate of SCR 82. SCR 82 is disposed to selectively provide a current path around, by passing, the coil of relay 83.

In the event that a failure of a component within power switch 16 occurs, the resultant change in voltage of the motor causes the input signal 76 applied to the positive input (pin 74) of comparator 73 to go higher than the input signal 78 at the negative input (pin 77). This results in the output (pin 80) going high triggering SCR 81. When SCR 81 is triggered control voltage 70 is clamped to a much lower voltage, and the gate 82a of SCR 82 is biased to clamp relay 83 off. Control voltage 70 is then completely shut down, resulting in SCR 52 and SCR 53 ceasing to conduct. This allows the capacitor voltage on capacitor bank 54 to fail, thus cutting d.c. voltage output 72. The result is a reduction of motor speed or complete cessation until the problem within power switch 16 is remedied. Should an operator of the equipment being driven by the motor attempt to force the equipment to exceed predetermined r.p.m., then voltage input 76 would again exceed input signal 78 resulting in the shut down of the d.c. output 72.

To prevent damage to the various integrated circuits, such as, for example, CMOS circuits, due to excessive rises in control voltage, a zener diode 84 is connected between the gate and anode of SCR 81. If control voltage 70 exceeds the zener voltage, SCR 81 is activated to clamp the control voltage 70 to a lower value, and turn on SCR 82, thus unlatching relay 83, resulting in the cut back in d.c. output 72.

Finally, the d.c. output 72 is also shut down in the event that SCR 52 or 53 fails to properly rectify. Such a failure tends to cause excessive rippling in the signal to capacitor bank 54, resulting a ripple in excess of a predetermined level, e.g., 30 volts d.c., at the positive lead A+ of the motor. Again, sensed motor voltage input signal 76 exceeds reference input signal 78 at voltage comparator 73, resulting in the eventual shutting off of control signal 70 and therefore d.c. output 72.

Figure 5:
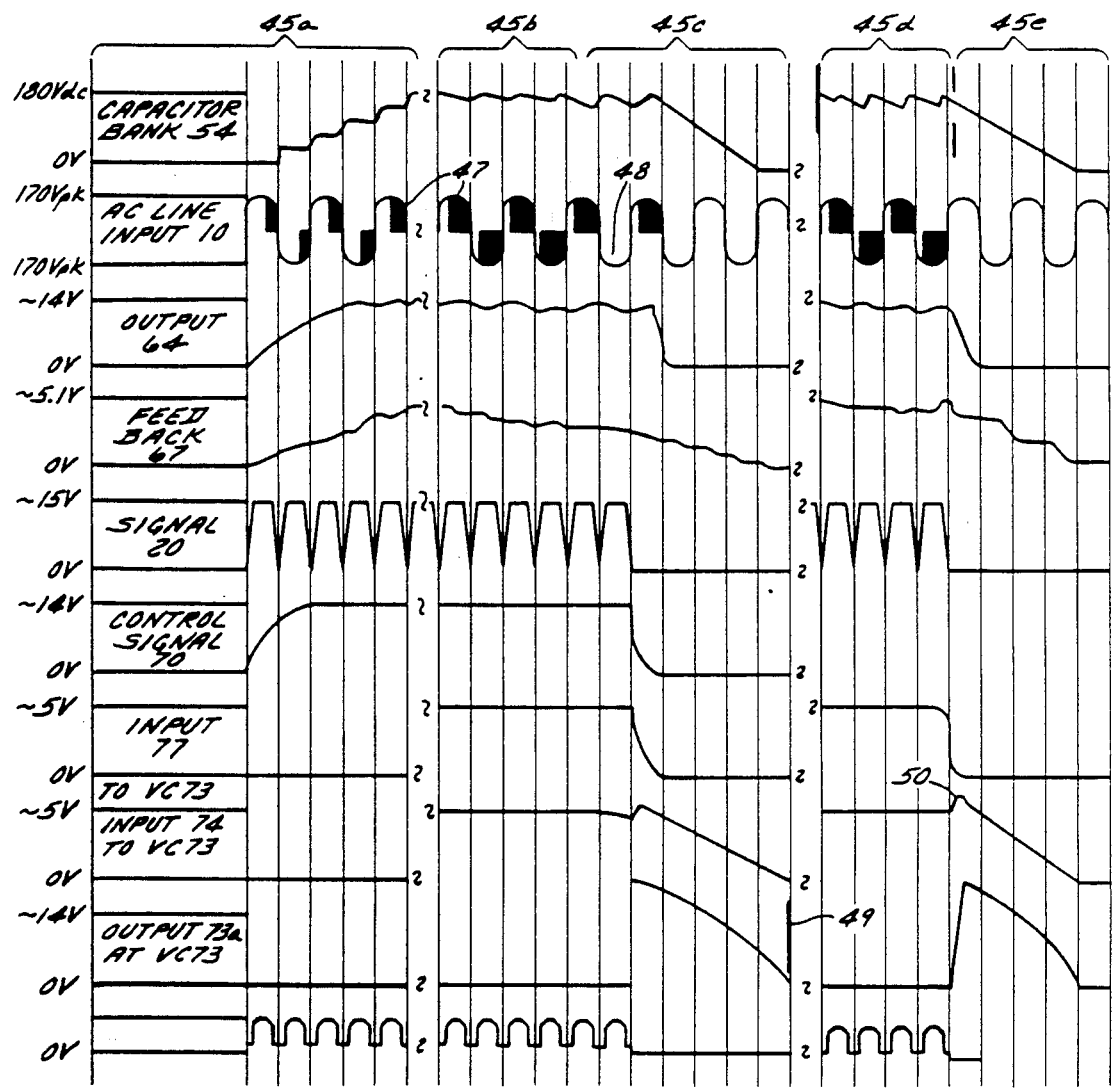
FIG. 5 is a timing diagram of the various components set forth in FIGS. 3 and 4.

The time diagram of FIG. 5 depicts the time sequence of events which occur under the various conditions described in reference to the schematics of FIGS. 3 and 4. As the circuit is turned on (as denoted under bracket 45a) capacitor bank 54 begins to ramp up to its peak value and the a.c. line voltage input 10 is fed to SCR's 51 and 52. The conduction angle noted by the numeral 47 and superimposed in dark on the sine wave of a.c. output 10 becomes increasingly large. Output 64 of amplifier 60 similarly quickly reaches a maximum value. Pulsating d.c. signal 20 to control voltage circuit 22 is also quickly generated, resulting in the generation of control voltage 70. In the portion of the time diagram indicated under bracket 45b, the conduction angle has reached its maximum. When one of the SCR's 52 or 53 misfire as indicated by the absence of a conduction angle shown by numeral 48 under bracket 45c, signal 73a from voltage comparator 73 suddenly peaks, causing SCR 82 to fire resulting in the shut off of relay 83. Signal 20 and therefore control voltage 70 immediately drop, resulting in the shut off of SCR's 52 and 53. Vertical line 49 indicates that motor 18 has been stopped.

Bracket 45d portrays again a normal full speed timing diagram until a short occurs in the power switch 16. As seen under bracket 45e, there is a brief upswing in motor 18 as indicated by the peak 50 in signal 74. Again signal 73a peaks and declines, causing SCR 82 to again fire, resulting in the shut off of SCR's 52, 53 and cessation of motor 18.

Figure 6:
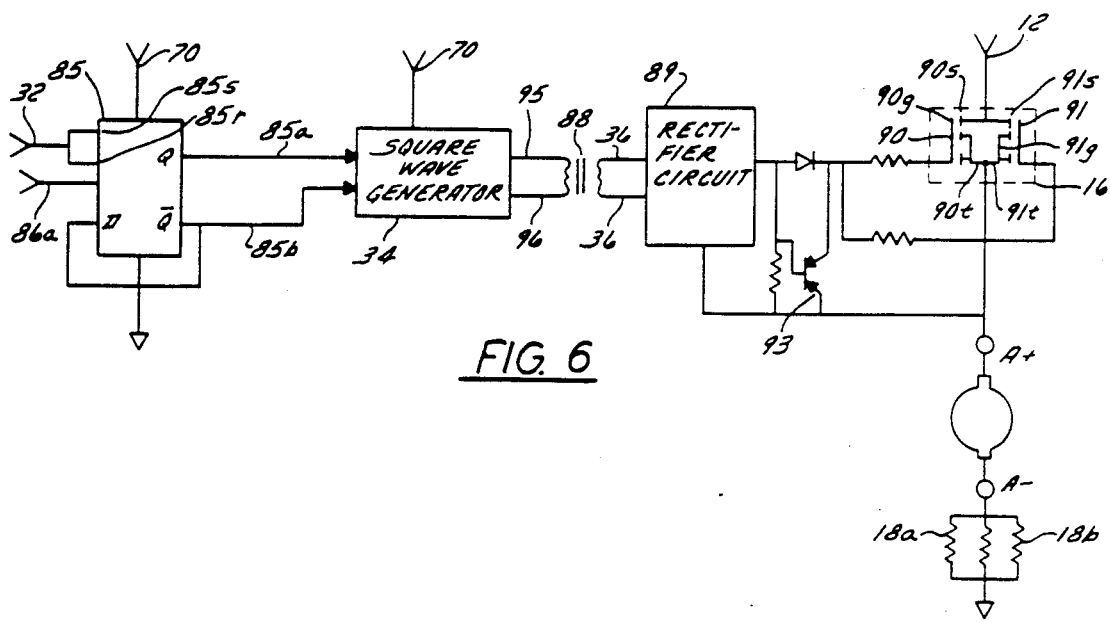
FIG. 6 is a schematic of that portion of FIG. 1 pertaining to the power switch, and pulse width modulator.

Referring to FIG. 6, power switch 16, square wave generator 34 and pulse generator 38 will now be more fully described. Power switch 16, suitably a pair of MOSFET transistors 90 and 91, is set forth in a circuit which isolates gates 90g and 91g from common control. The circuit provides for the MOSFET gates 90g and 91g to be ground referenced to the source terminals 90t and 91t which are at the A+ or positive lead 17 of motor 18 and not grounded. The MOSFET transistors, which may be of a type known as IRF640 available from Siliconix or General Electric, float on the d.c. output or supply voltage 72 which for 120 a.c. current input is in the range of 125-180 volts d.c. Applicant has found that such an arrangement provides extremely quick power switch responses.

A flip-flop 85 having set 85s and reset 85r pins tied together, receives a digital pulse and a clock pulse 86a. The flip-flop 85 is powered by reference voltage signal 70. The signal outputs 85a and 85b are clocked out from the Q and $\overline{Q}$ pins to square wave generator 34. Square wave generator 34 may comprise a pair of totem pole transistors or an equivalent circuit compatible to provide an essentially square wave over lines 95 to the primary of transformer 88. Such square wave prevents transformer 88 from saturating. The power consumption required is advantageously low and in the range of 15-20 milliamperes. An isolated voltage is then produced on the secondary of transformer 88 and via bridge rectifier 89, for example, a diode bridge rectifier, is ramped up on gates 90g and 91g in about 2 microseconds. The voltage on gates 90g, 91g then falls when the signal outputs 85a, 85b of Q and $\overline{Q}$ go high in about 2 to 3 microseconds. Transistor 93 keeps both gates 90g, 91g clamped near zero volts when signal outputs 85a, 85b respectively of Q, $\overline{Q}$ pins are high. Thus, the gate voltage is either on at about 12-14 volts d.c. or off below about 2 volts d.c. Thus, the gates cannot float with this type of drive circuit.

The current draw requires that the input of transformer 88 is through the bridge rectifier 89 and secondary of transformer 88. This is a maximum at the turn on of MOSFETS 90, 91 as the gates 90g, 91g are charging up requiring only the aforementioned 15 to 20 milliamperes. When flip-flop 85 reset and set inputs 85r and 85s are low, Q and $\overline{Q}$ signal outputs 85a and 85b are clocked out alternately high and low and are employed to generate a square wave signal to transistor 34. In turn, under normal conditions, rectifier 89 provides the even width d.c. pulses to gate 90g and 91g.

Figure 7:
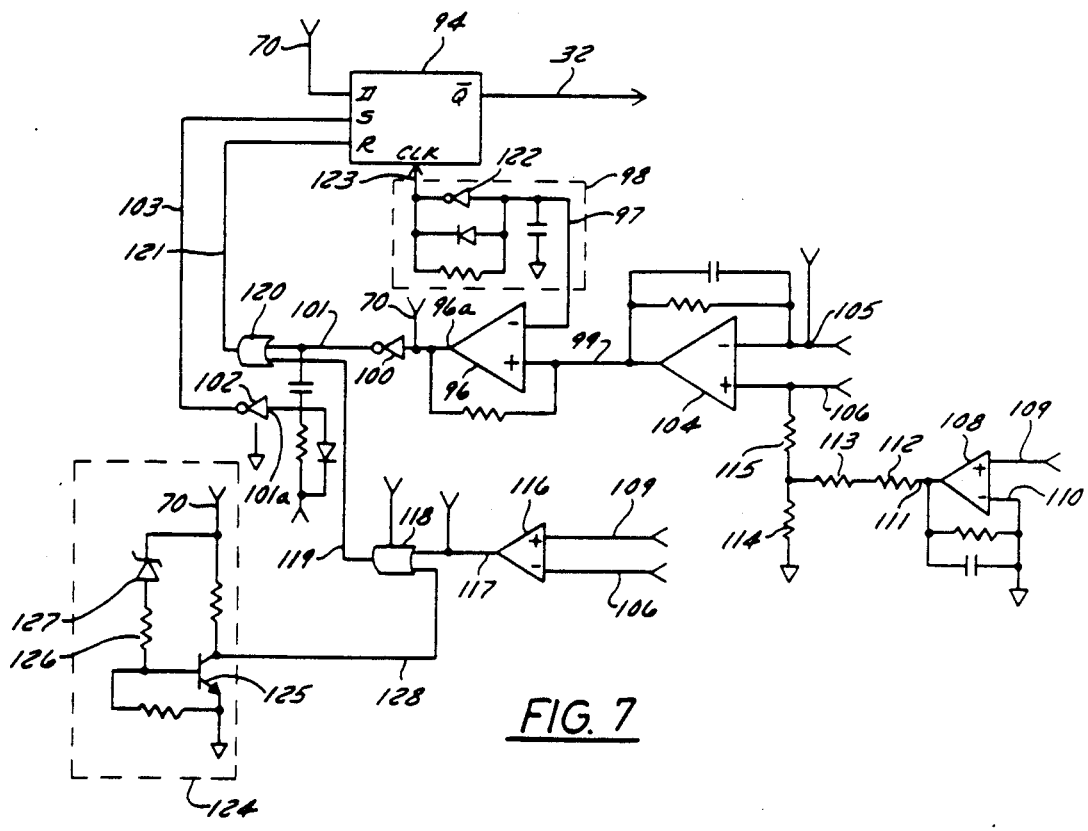
FIG. 7 is a schematic of that portion of FIG. 1 pertaining to the pulse width modulator, error sensor and low control voltage disabler.

Pulse width modulator 28, error sensor 42 and low control voltage disabler 24 will now be more fully described. As illustrated in the schematic of FIG. 7, the circuitry includes a flip-flop 94, a comparator 96, a sawtooth clock generator 98, respective operational amplifiers 104 and 108, a comparator 116, and low voltage disable circuit 124. $\overline{Q}$ output of flip-flop 94 is clocked out low as long as flip-flop 94 is set by an input signal 103. To set flip-flop 94, comparator 96 compares a sawtooth signal 97 supplied by sawtooth clock generator 98 to an error voltage signal 99 provided by amplifier 104 as will be explained. When signal 99 is higher than signal 97, the output signal 96a of comparator 96 goes high. Signal 96a is applied to the input of an invertor 100 with a resultant low output signal 101 being sent to the input of an invertor 102. Output signal 103 from invertor 102 goes high for about 500 nanoseconds, setting flip-flop 94 on the leading edge of the 500 nanosecond pulse.

A particularly advantageous function of the control circuit provided in accordance with the present invention is the ability of the circuit to maintain constant motor speed with changes in motor load through both armature voltage feed back and armature current feed back without resort to the use of tachometers or the like complicated associated circuitry. This is accomplished through sensing the armature voltage at the A+ terminal of the motor and through the simultaneous sensing of the armature current at the negative lead of the motor. The sensed armature voltage signal 105 is supplied to the inverting input of operational amplifier 104. Operational amplifier 108 receives a voltage feedback signal 109 representing the armature current. The output signal 111 of amplifier 108 is divided by resistors 112, 113 and 114 and then supplied by resistor 115 along with speed reference voltage signal 106 which is summed by amplifier 104. Speed reference signal 106 is taken from potentiometer 131 as best seen in FIG. 1. The output signal 99 of amplifier 104, is the error signal input to comparator 96. When signal 99 is larger than the sawtooth signal, output 96a remains high. The larger the value of signal 99, the wider the output pulse 40 is to power switch 16 thus resulting in gates 90g, 91g remaining on longer and providing a large d.c. input pulse to motor 18. Thus, motor 18 spins faster as more current is supplied for the heavier loads.

When the duty cycle is at 100%, flip-flop 94 remains set unless the current limit is exceeded. However, should the predetermined current limit be exceeded, motor 18 is slowed. Comparator 116 compares the current feedback voltage 109 to a current limit reference signal 106. If the current limit is exceeded, comparator output signal 117 goes high, causing output signal 119 of an OR gate 118 to go high. The output signal 121 of an OR gate 120 therefore goes high. Signal 121 then resets flip-flop 94 causing output 32 from $\overline{Q}$ to go high, resulting in slowing of motor 18. Additionally, since the circuit was terminated because of excessive current, flip-flop 94 will not receive a pulse necessary to set flip-flop 94. The setting of flip-flop 94, however, is accomplished through clocking with the output 123 of invertor 122 (in sawtooth generator 98) with control voltage 70 applied to the data input of flip-flop 94. Output 123 is about 0.5 microseconds at low output. This, therefore, ensures that flip-flop 94 receives a pulse every cycle irrespective of the duty cycle and when the current limit mode is in effect.

Additionally, protection is provided to the control circuit of the present invention by low voltage disable circuit 124. Low voltage disable circuit 124 suitably comprises a transistor 125, a resistor 126 and a zener diode 127. Control voltage 70 is provided at the collector of transistor 125, which under normal operation would forward bias transistor 125. It is important that reliable operation of the circuit be assured when the control voltage goes below a predetermined minimum such as about 11 volts d.c. Should this event occur, transistor 125 will not be forward biased by resistor 126 and diode 127, and the collector voltage will go high. This results in the output signal 119 of OR gate going high, resetting flip-flop 94 through OR gate 120. This in turn results in the reduction of gate voltage at MOSFETS 90 and 91 and the consequential turn off of the MOSFETS.

Figure 8:
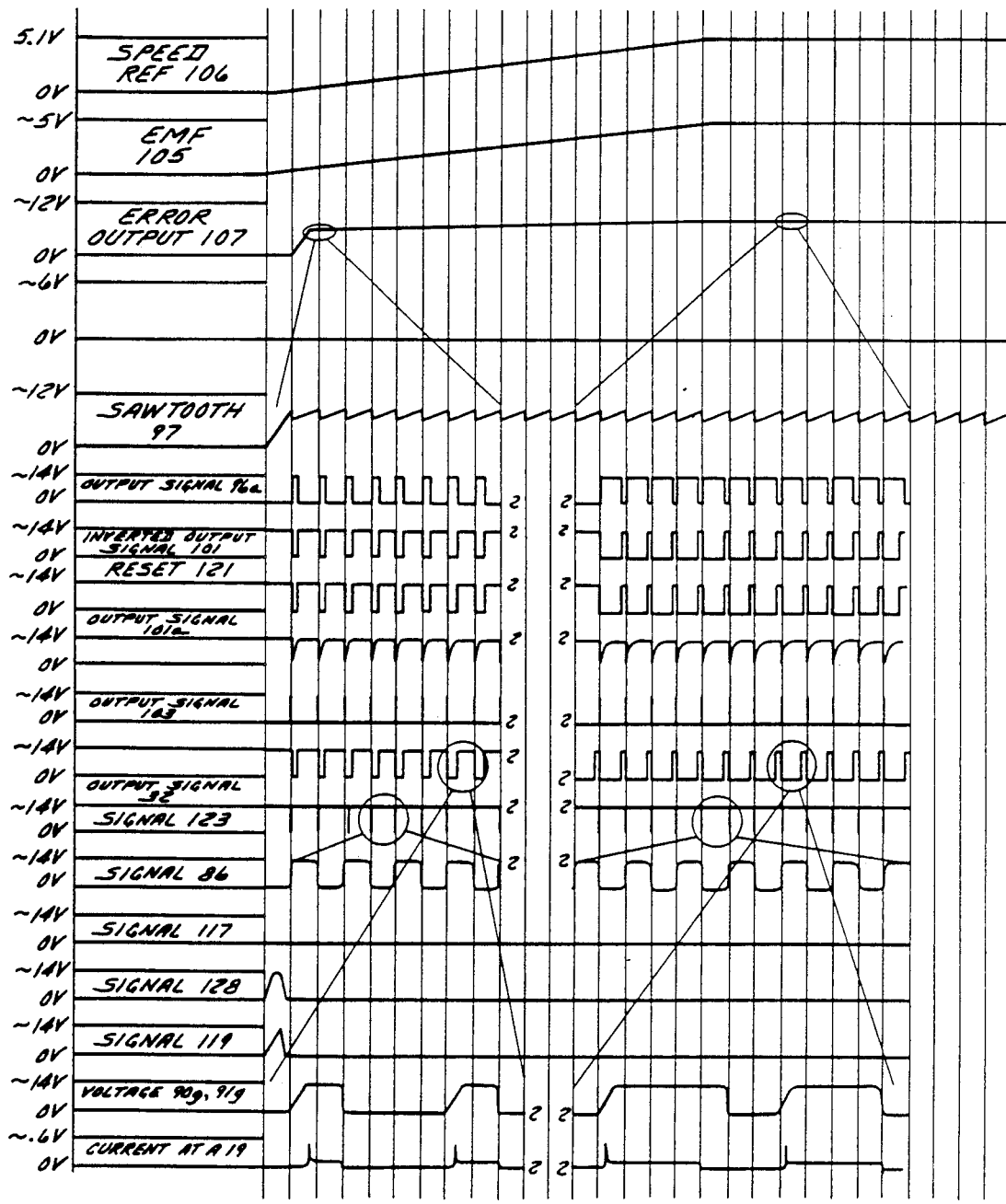
FIG. 8 is a timing diagram of the various wave forms involved from the start up of the control system to full speed, light load operating conditions.

In order to more clearly understand the operation of the circuit, reference is now made to FIG. 8 which represents the various wave forms of the circuit during normal operation. The circuit is initially switched on and motor 18 is accelerated from start to full speed at a light load. Signals 105 and 106, the voltage feedback signals and reference speed input, respectively, increase and reach peak value after about 10 seconds following control turn on. Signal 107 output from amplifier 104 quickly reaches a value commensurate with full speed, light load values under normal conditions. To provide a more comprehensive understanding of the timing sequence, the portion of the timing diagram below the signal 107 waveform has been expanded. Thus, the sawtooth signal 97 which may have a frequency of 18 kilohertz can be adequately portrayed. The output signal 96a of comparator 96 can be seen to be on the leading edge of saw tooth signal 97. Initially signal 96a is of short duration, but increases as the motor speed is increased. The same is true of the inverted output signal 101 and the reset signal 121. As can be seen, signal 101a, the output of invertor 102 and the output pulse or signal 103 to the set pin of flip-flop 94 have a short duration, the latter being about 0.5 microseconds.

It is clear that the interval of time that the signal 121 is low continually increases as the motor speed approaches full speed. During this time interval, $\bar{Q}$ is low and the clock signal 86a from clock generator 86 continues to clock F/F 85; signal 32 increases in duration as speed increases. The voltage on gates 90g, 91g is also shown in further expanded form showing a rise from 0 volts to 14 volts in about 5 microseconds, a fall in about 3 microseconds with approximately 55 microsecond interval at 18 Khz.

The right hand position of the timing diagram of FIG. 8 indicates the sequence occurring at full motor speed with a light load. The pulse width of signal 96a reflects the high speed of the motor and it may be seen that gates 90g and 91g are conducting much longer than before resulting in a concomitant increase in motor current as detected at the A-terminal.

Figure 9:
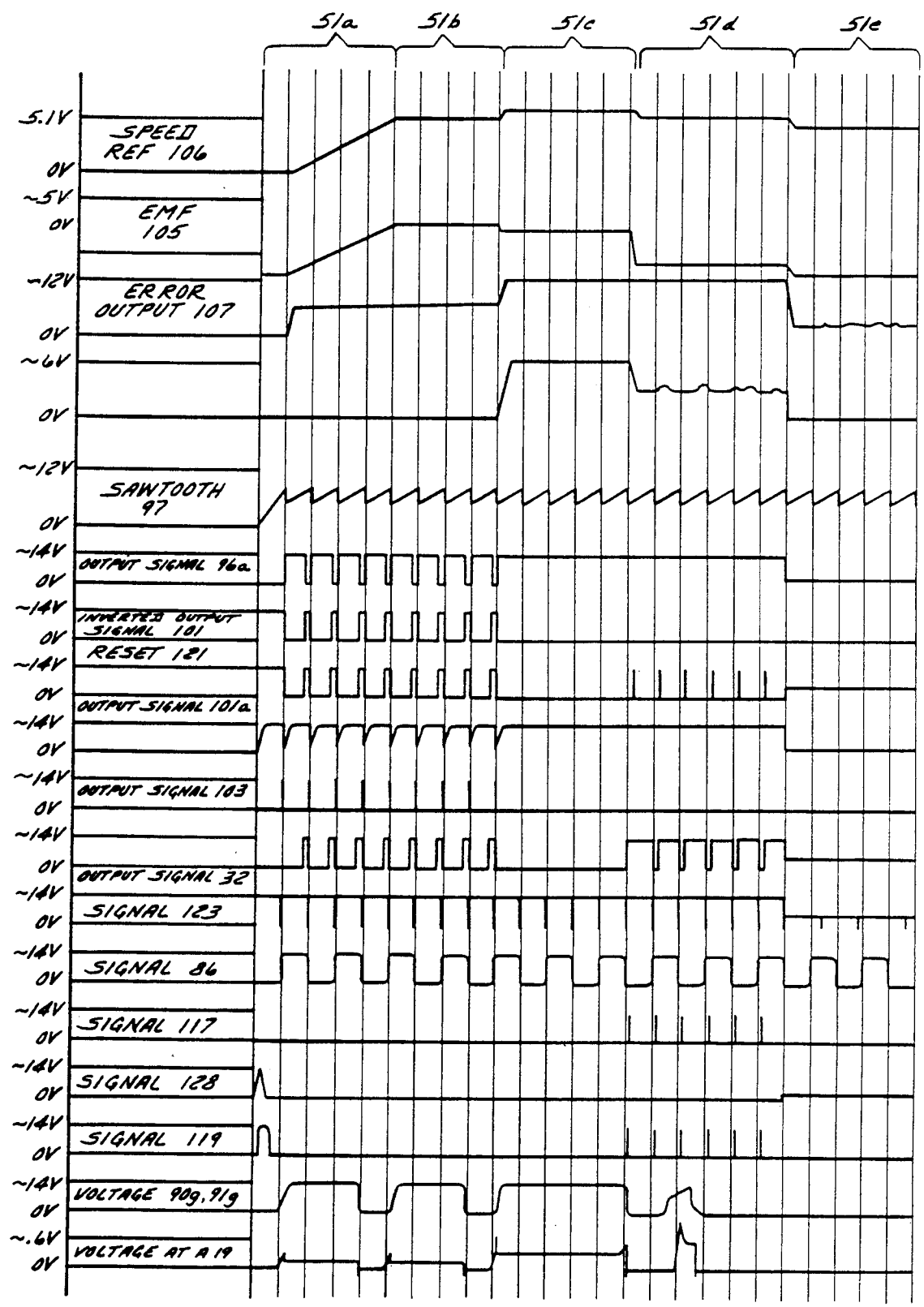
FIG. 9 is a timing diagram of the various wave forms involved from the start up of the control system to full speed, full load operating conditions and, additionally, including abnormal conditions due to overload and low control voltage.

FIG. 9 is a timing diagram similar to FIG. 8 in that the wave forms at start up and full speed, light load are shown. Additionally, however, wave forms are illustrated which occur when the motor is at full speed with fully rated load, when an overload is applied in current limit mode, and when a component fails resulting in undervoltage of the control circuit. Brackets 51a-e depict the underlying portion of the diagram applying to each event mentioned above with bracket 51a portraying start up and bracket 51b portraying full speed, light load.

The portion of the diagram under bracket 51c illustrates the motor running at full speed and full load. The signal output 96a is continuously high. Similarly, the output 32 from $\bar{Q}$ is continuously low resulting in gates 90g, 91g being essentially continuously conductive. When an overload is experienced, however, as under bracket 51d, error signal 117 appears high briefly as does the output signal 119 which resets flip-flop 94, resulting in the intermittent reduction in voltage on gates 90g and 91g and in the temporary stalling of motor 18. The timing sequence occurring when the control voltage drops below a predetermined level is shown under bracket 51e. Signal 128 is shown going high, resulting in signal 121 remaining high, resetting flip-flop 94 until the control voltage returns to normal. As may be seen, the voltage at gates 90g, 91g becomes too small and the motor current 19 is shut down.

With some applications it may be desirable and acceptable to eliminate certain components of the control circuit. For example, SCR 82 and relay 84 may be eliminated if external switch 130 (see FIG. 1) to turn on the circuit is not desired. Thus, when a.c. current is applied to input 10, the control turns on and remains on until such time as the fault circuit is triggered. In such instance, SCR 81 clamps control voltage to about 3 volts d.c., disabling SCR 52 and SCR 53, cutting off the capacitor bank 54 voltage which in turn causes the low voltage circuit 124 to be activated as described above.

If it is desired to reduce the rated horsepower, then the resistance of resistor 116a may be lowered, for example, from the rated 8.25K ohms to 3K ohms to lower the current limit reference to amplifier 116 and the capacitance of 73b to 0.1 microfarads (see FIG. 4) increased to provide greater stability in the event of an overspeed shutdown of the circuit described in FIG. 4. Additionally, MOSFET 91 may be eliminated since MOSFET 90 is able to provide the total armature current for the motor. Also one of resistors 18a or 18b shown in parallel may be eliminated due to the lower current requirements.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

I claim:

1. A control circuit for operating and controlling a d.c. motor driven from an a.c. signal, said circuit comprising:
   (a) rectifier means, responsive to said a.c. signal and control signals applied thereto, for selectively generating a d.c. signal to said d.c. motor;
   (b) pulse width modulator means for generating a pulse width modulated signal; said pulse width modulator means including:
      (i) means for generating a pulse train corresponding to a desired motor speed;
      (ii) means, responsive to said pulse train, for generating a square wave signal; and
      (iii) means, including a transformer and a bridge circuit, for rectifying said square wave signal into said pulse width modulated signal;
   (c) power switch means, responsive to said pulse width modulated signal, for selectively interrupting said d.c. signal to said motor.

2. The circuit of claim 1 further comprising an error signal generating means for sensing a d.c. voltage at a positive lead of said motor and generating a first signal indicative of said sensed voltage, means for providing a predetermined speed reference signal, means for comparing said first signal to said speed reference signal and generating an error signal indicative of the difference between said first signal and said speed reference signal, said pulse width modulator means, in response to said error signal, generating a pulse width proportional to said error signal.

3. The circuit of claim 2 including means for sensing current at a point on a negative lead from said motor and generating a second signal proportional to the sensed current, said comparing means summing said second signal and said speed reference signal to produce said error signal proportional to the difference between (i) said second signal and (ii) said speed reference signal and said first signal.

4. The circuit of claim 1, wherein said power switch means includes at least one MOSFET-type transistor wherein a source thereof is connected to a positive lead to said motor and a gate thereof is connected to said pulse width modulator means, said gate being ground referenced to said source.

5. The circuit of claim 1, wherein said pulse train has a fixed frequency and a variable duty cycle indicative of said desired motor speed.

6. The circuit of claim 1 further including means, responsive to an operator input, for enabling said control circuit, and interrupting said d.c. signal to said motor in response to the effective magnitude of said d.c. signal applied to said motor exceeding a predetermined magnitude.

7. The circuit of claim 6, wherein said means for enabling and interrupting comprises means for disabling said power switch.

8. A method for operating and controlling a d.c. motor driven from an a.c. line signal, said method comprising the steps of:
(a) producing a d.c. signal from said a.c. line signal by
   (i) controllably rectifying said a.c. signal to generate a rectified signal,
   (ii) applying said rectified signal to a capacitive circuit to generate a smooth d.c. signal, and
   (iii) controlling said rectification in accordance with the magnitude of said smooth d.c. signal, to maintain the magnitude of said smooth d.c. signal within a predetermined range,
(b) intermittently applying said smooth d.c. signal to said motor through at least one switching device electrically interposed to provide a controllable current path between said capacitive circuit and said motor;
(c) applying a pulse width modulated (pwm) signal to said switching device to selectively render said current path conductive in accordance with said pwm signal.

9. The method of claim 8 further including the steps of:
sensing an armature voltage and an armature current of said motor;
adjusting the duty cycle of said pwm signal in accordance with variations in said armature voltage and armature current.

10. The method of claim 9 wherein said adjusting step comprises the steps of:
generating, from a signal indicative of said sensed armature current and a signal indicative of a desired motor speed, a feedback signal;
generating a signal indicative of said sensed armature voltage an error signal indicative of the difference between said feedback signal and said signal indicative of said sensed armature voltage; and
adjusting the duty cycle of said pwm signal in accordance with said error signal.

11. A control circuit for operating and controlling a d.c. motor comprising:
(a) d.c. generating means for producing a d.c. signal of a first nominal magnitude in response to a control signal applied thereto, and of a reduced magnitude in the absence of said control signal;
(b) power switch means, responsive to a pulse width modulated signal, for selectively providing said d.c. signal to said motor;
(c) means for sensing predetermined operating parameters of said control circuit; and
(d) means for selectively applying said control signal to said d.c. generating means, and inhibiting application of said control signal in response to at least one of said operating parameters in said control circuit deviating by at least a predetermined amount from a respective associated reference value.

12. The control circuit of claim 11 in which said d.c. generating means includes at least one rectifying element, for converting an a.c. input into said d.c. signal, said rectifying element conducting only in the presence of said control signal.

13. The control circuit of claim 12 in which said sensed operating parameters include the magnitude of said d.c. signal.

14. The control circuit of claim 12 in which said sensed operating parameters include the magnitude of said control signal.

15. The control circuit of claim 11 including means for inhibiting said power switch means in response to said control voltage being below a predetermined minimum.

16. A control circuit for a d.c. motor, said control circuit comprising:
a d.c. signal generator, responsive to a level signal applied thereto, for providing a d.c. signal;
a pulse width modulator for generating a pwm signal corresponding to a desired motor operating speed;
a power switch, responsive to an enable signal applied thereto and said pwm signal, and electrically interposed between said d.c. signal generator and said motor to, when enabled, selectively apply said d.c. signal to said motor in accordance with said pwm signals;
means for monitoring at least one of
  component failure in said power switch;
  a magnitude of said d.c. signal as compared to a reference magnitude;
  component failure in said d.c. signal generator; and
  ripple in said d.c. signal as against a reference level; and
control circuit means for selectively generating said level signal to said d.c. generator and said enable signal to said power switch in accordance with said monitoring.

17. A method for controlling a d.c. motor, said method comprising the steps of:
responsive to a level control signal, providing a d.c. signal for a d.c. signal generator;
generating a pwm signal corresponding to a desired motor operating speed;
responsive to an enable signal and said pwm signal, selectively applying said d.c. signal to said motor through a power switch in accordance with said enable signal and said pwm signals;
monitoring at least one of:
  component failure in said power switch;
  a magnitude of said d.c. signal as compared to a reference magnitude;
  component failure in said d.c. signal generator; and
  ripple in said d.c. signal as against a reference level; and
selectively generating said level signal to said d.c. generator and said enable signal to said power switch in accordance with said monitoring.

* * * * *